Feb. 16, 1954

R. B. LIGHTFOOT 2,669,313

HELICOPTER ROTOR

Filed Jan. 18, 1947

RALPH BUTTERWORTH LIGHTFOOT
INVENTOR

BY *Charles L. Shelton*

ATTORNEY

Feb. 16, 1954  R. B. LIGHTFOOT  2,669,313
HELICOPTER ROTOR

Filed Jan. 18, 1947  4 Sheets-Sheet 3

RALPH BUTTERWORTH LIGHTFOOT
INVENTOR

BY Charles L. Shelton
ATTORNEY

Feb. 16, 1954

R. B. LIGHTFOOT 2,669,313

HELICOPTER ROTOR

Filed Jan. 18, 1947

RALPH BUTTERWORTH LIGHTFOOT
INVENTOR

BY *Charles L. Shelton*

ATTORNEY

Patented Feb. 16, 1954

2,669,313

UNITED STATES PATENT OFFICE 2,669,313

HELICOPTER ROTOR

Ralph B. Lightfoot, Stratford, Conn., assignor to United Aircraft Corporation, East Hartford, Conn., a corporation of Delaware Application January 18, 1947, Serial No. 722,891

13 Claims. (Cl. 170—160.25)

This invention relates generally to improved rotary wing aircraft, and more particularly to a control system including improved blade structure for rendering a helicopter, or the like, stable in flight. The invention is adapted for use in combination with such craft as disclosed in Patent No. 2,517,509 of I. I. Sikorsky, issued August 1, 1950, and entitled Helicopter; although the invention is not limited to use with such type of craft.

One of the most serious objections to the controls for helicopters of different experimental types has been that of lack of stability in flight. If a helicopter is made stable by using inertia devices, a highly undesirable lag in control action may be introduced to reduce maneuverability. Also, such devices may stress other parts excessively, and introduce harmonic inertia forces that may render erratic any maneuver but steady flight.

Stabilizing devices incorporating weights or the like mounted upon hinges, and dependent in their path of revolution upon the axis of their rotation, will assume different planes of rotation about such axis during a change of position of the axis. In other words, there will be an inertia lag followed by a hunt for the new axis; or if damped they will assume the new axis with an asymptotic approach to the new axis, which approach may eliminate hunt but substantially increase the lag. Accordingly, if the axis is being translated in space in a steady state attitude, and another attitude is desired, the controls may be manipulated in a manner to obtain such new attitude; but the attitude will be obtained only after sufficient time has elapsed after initiating the control movement to permit the inertia devices to respond. Accordingly, for close maneuvering near obstacles or the ground, or for rapid maneuvering during flight, such inertia devices will fail.

In the aforementioned application, a control arrangement is disclosed whereby the aerodynamic phenomena in flight will cause the rotor to assume a substantially stable attitude when the rotor is connected with a body having inertia and a predetermined pendulosity and drag. Such a combination, however, is subject somewhat to lags due to this body inertia. Accordingly, this type of craft does not provide a fully stable rotor, even though fast maneuverability and resultant safety are obtained in this craft.

This invention provides a combination of elements including an improved rotor blade having a feathering axis, an aerodynamic center, and a center of gravity arranged with respect to each other and connected to reversible controls so that the rotor itself is stable and permits the body of the helicopter to assume different shapes and have different centers of gravity and aerodynamic attributes. The rotor in this invention is aerodynamically stabilized and is not dependent upon the attitude of the rotor with relation to the body of the helicopter, other than for general design reasons. It is desirable that the center of thrust of the rotor be as near as practicably possible vertically aligned with the center of gravity of the body for a normal desirable attitude of the body of the helicopter. In other words, the rotor itself is not dependent upon any specific position of the body for stability.

A further feature of this invention attendant the improving of the aerodynamic action for providing a stable rotor is the provision in the rotor blades of inherent vibration damping structure, which structure acts to cancel out the primary vibration due to blade flapping and to the non-coincidence of the center of gravity, the center of lift and the feathering axis of the blade, whereby the second harmonic of such flapping vibration is rendered out of phase with, and hence damping with respect to, a rotary component of aerodynamic lift changes, thereby reducing vibrations in the blades and in the aircraft.

Accordingly, it is an object of this invention to provide a stabilized sustaining rotor for helicopters, or the like, so flight may be maintained without manual application of control.

Another object is to provide an improved rotor blade for helicopters, or the like, in which vibrations are damped in the blade and hence stresses reduced in the blade and in attached parts.

A further object is to provide an improved control device for helicopters including a dynamically damped blade, which blade has inherent aerodynamic stabilizing effects in rotation and translation in yawing flight.

Further objects and advantages lie in the features of construction including the various combinations and sub-combinations of such features, and will be either obvious or pointed out in the following specification and claims.

Figure 1:
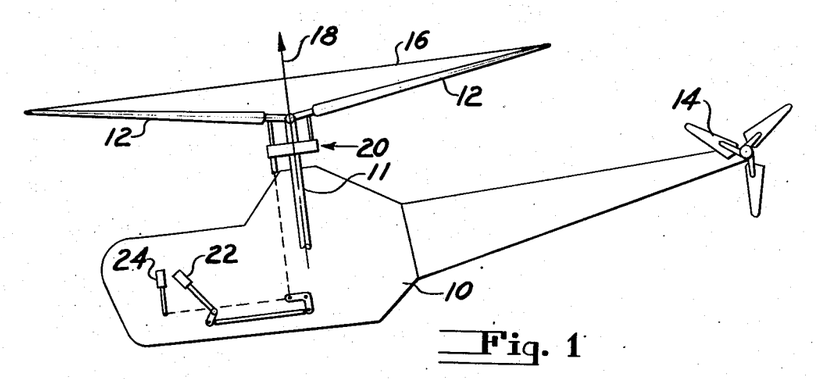
Fig. 1 is a diagrammatic view of a helicopter including my invention.

Referring more in detail to the drawings, in Fig. 1 a helicopter body 10 mounts an engine, not shown, which turns rotor blades 12, of which there may be any suitable number, through a drive shaft 11, and turns a tail rotor 14 through a shaft, not shown. The tips of the rotor blades 12 describe a circular path, defining what is commonly called the tip path plane, represented diagrammatically at 16. The rotor blades 12 add their thrusts to give a total thrust diagrammatically represented at 18. The total thrust 18 may be controlled by a total pitch lever 22 that may be rotated to move a control mechanism 20, to be discussed more in detail later, to change similarly the pitch of all of the blades 12. On an increase in blade pitch, the blades can absorb more power from the engine and pass a greater mass of air through the rotor to increase the rotor thrust, and vice versa upon decreasing the pitch of the blades. The direction of thrust may be controlled by tilting the control mechanism 20. A control stick 24 is provided in the cabin of the helicopter and connected with the control mechanism 20 by suitable links so that the mechanism 20 may be tilted in any direction in azimuth. Thus, if forward flight is desired, the stick 24 may be pushed forwardly to cause the blades 12 to have a decreased angle of attack when advancing toward the front of the body 10, and an increased angle of attack when retreating backwardly toward the tail of the body 10. This will cause an increased lift during the retreating portion of a revolution and a resultant tilt of the tip plane path 16 downwardly adjacent the front and upwardly adjacent the tail of the body 10. Such tilting will cause the total thrust 18 to have a lift component to sustain the helicopter and a forward component to propel the same.

Figure 2:
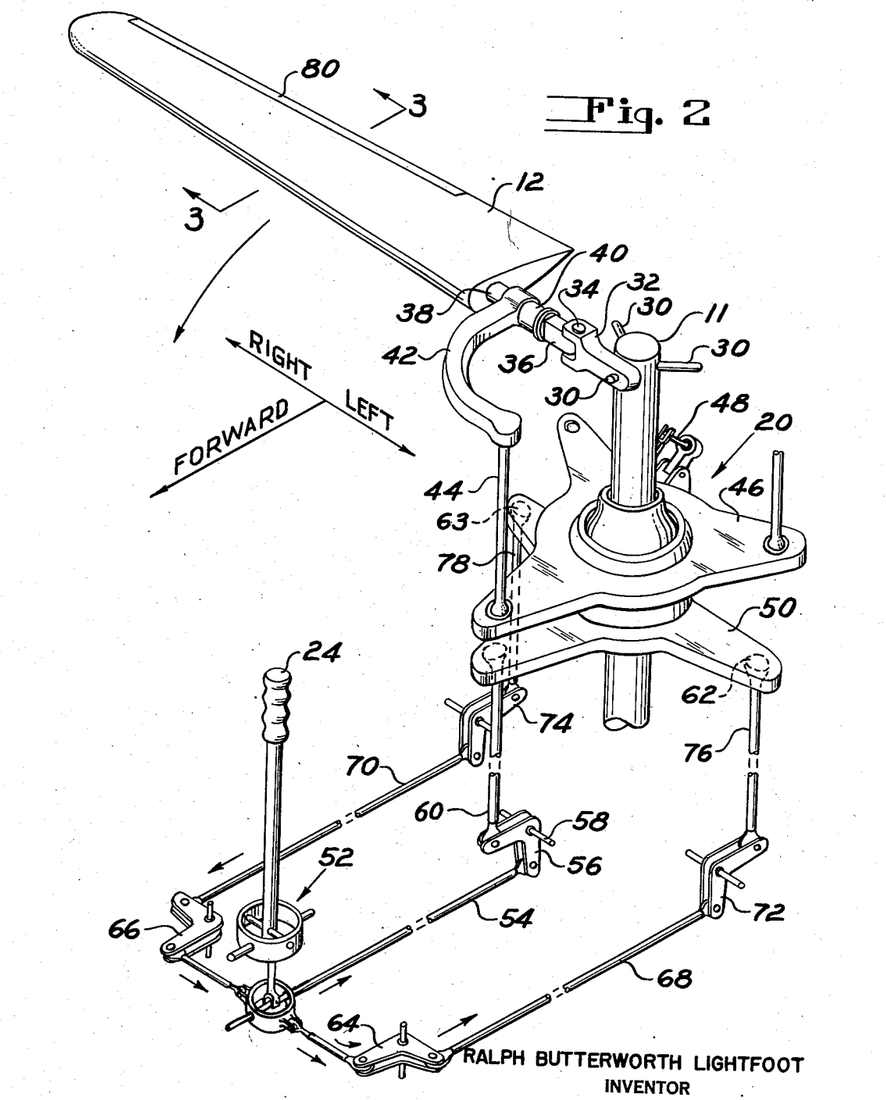
Fig. 2 is a diagrammatic perspective view of a rotor blade and control therefor of my invention.

Referring now to Fig. 2, a rotor blade and the controls therefor are shown diagrammatically, but more in detail. The total pitch mechanism controlled from the arm 22, Fig. 1, is not shown to avoid confusion in the drawing; however, it is to be understood that any suitable manual or automatic total pitch control connections may be associated with the control mechanism 20 for raising or lowering the same upon the shaft 11 to change the pitch of all of the blades 12. One convenient means adapted for use with the type of control now to be described in detail is disclosed in Patent No. 2,599,690 of Michael D. Buivid et al., issued June 10, 1952, and entitled Helicopter, in which the total pitch control arm raises and lowers pivots of bell cranks, which bell cranks also are operated by the azimuth control stick.

The shaft 11 may be provided at its upper end with substantially horizontal pins 30 upon which flapping links 32 are mounted. Each flapping link 32 may be provided with a vertical pivot 34 for mounting a stub spar 36. The blade 12 may be secured to the stub spar 36 by means of a blade spar 38 connected with a sleeve 40 which can be secured by thrust bearings, not shown, to the stub spar 36. With such connections the blade 12 is universally mounted with respect to the shaft 11 and can move up and down in a flapping sense, back and forth in its plane of rotation in a lag lead sense, and can rotate around the stub spar 36 which is in alignment with the blade spar 38 for change of pitch.

The pitch of the blade 12 is controlled through the control mechanism 20 connected with the spar 38 by a control horn 42, a push-pull rod 44, and a plate 46 which is connected with the shaft 11 by a scissors device 48 and thus constrained to rotate with the shaft 11. The plate 46 is connected as by bearings, not shown, with a second plate 50. The plate 50 may be connected as by scissors, not shown, with the body of the helicopter so that it is non-rotatable with respect to the body but may be moved up and down either under the influence of the total pitch control arm 22 (Fig. 1), or tilted with respect to the body of the helicopter by operation of the control stick 24. Because of the bearing connection of the plates 46 and 50, up and down and tilting movement of the plate 50 will cause corresponding movement of the plate 46.

For manual control of blade tip path plane tilting, the stick 24 may be moved in any direction in azimuth to tilt the control mechanism 20. For example, upon forward movement of the handle portion of the control stick 24, the stick will rotate upon a gimbal 52 to cause a link 54 to be moved aft. Such movement will cause counterclockwise rotation of a bell crank 56 around a pivot 58, and hence lowering of a push-pull rod 60. Such movement will cause tilting of the control mechanism 20 and lowering of the push-pull rod 44 connected with the control horn 42 in the position shown. Such lowering will reduce the pitch of the blade 12 as it advances toward the front of the helicopter, and an increase in pitch as it retreats toward the tail of the helicopter, and hence a tilt of the tip path plane 16 for causing forward flight as explained above in connection with Fig. 1.

Such forward tilt of the control mechanism 20 will be around pivots 62 and 63 controlled by lateral movements of the handle portion of the control stick 24. As the control stick 24 is moved toward the right, for example, bell cranks 64 and 66 will rotate in a counterclockwise direction to move a rod 68 aft and a rod 70 forward in equal amounts. The rods 68 and 70 are connected with bell cranks 72 and 74 respectively. Such movements of the rods 68 and 70 will cause counterclockwise movement of the bell crank 72 and clockwise movement of the bell crank 74 around their respective pivots. Such rotation of the bell cranks 72 and 74 will cause a rod 76 connected with the pivot 62 to be raised and a rod 78 connected with the pivot 63 to be lowered. Inasmuch as the fore and aft control rod 60 is stationary for this right hand movement of the control stick 24, the control mechanism 20 will be tilting downward at the right of the body of the helicopter and the tip path plane will be tilted downward at the right of the helicopter to cause right side translation thereof. The stick 24 can be moved in any direction in azimuth and the resulting tilt of the control mechanism 20 will be in the same direction due to the universal mounting of the control mechanism 20 and the control stick 24.

During forward flight of a helicopter the body may assume a position which tilts the drive shaft. Such tilting of the shaft will tilt the control mechanism associated therewith at a corresponding angle. The control stick 24, to maintain a steady state of flight, must be maintained in the position in space into which it is placed to obtain such a state. Thus the body tilt, and resultant control tilt, requires a change in stick-body relationship at different speeds. Hence for some helicopters, for some forward speed, the control stick 24 may be in substantially the same position with respect to the body of a helicopter as it would be in hovering flight, even though the stick remains tilted in space. The percentage of stick movement can be of any desired value with relation to the percentage of movement obtained in the control mechanism and proportioned to the drag of the ship so that a desirable position for the control stick 24 is obtained for normal flight conditions. It is important however that the control stick 24 need not be brought much back of the neutral position during normal flight so that ample control movement is available for decelerating the ship. The preferred stick displacement is 30-40 per cent of total available control to change from hovering to maximum speed. For the purpose of describing this invention, it will suffice to note that in a steady state flight condition, the control stick 24 may be in a position with respect to the neutral position for the stick so that very little if any cyclic pitch necessarily need be impressed upon the rotor. Of course, it is to be understood that the invention is not limited to use with such stick characteristics but will operate successfully with other relationships and any desired amount of cyclic pitch may be used, as will be clear from the description below.

However, it is a necessary condition that the several blades of the rotor be balanced both dynamically and aerodynamically with respect to each other or with respect to a given master blade. A method may be used such as is described in the co-pending application of H. T. Jensen and H. W. Bonnett, Serial No. 688,146, filed August 2, 1946, and assigned to the assignee of this application. By dynamic balance is meant the condition in which all of the blades of the rotor have the same pitch reducing moment for each pitch setting. This is commonly referred to as the propeller moment and is a function of the chordwise center of gravity integrated over the span of the blade. By aerodynamic balance is meant the condition in which all of the blades of the rotor have similar aerodynamic characteristics in regard to pitching moments about their feathering axis at all angles of blade incidence. When the value of the desired positive moment is arrived at, this moment must be applied in equal magnitude to all of the blades of the rotor.

In the present invention, the controls described above are reversible to a degree that may be predetermined by the physical proportions and mechanical advantages of the several parts, and the blades 12 of the rotor are adapted to exert forces backward through the control mechanism in a manner to render the rotor and controls therefor stable. The blade 12 has a tab 80 at its trailing edge which gives a positive (pitch increasing) pitching moment about the aerodynamic center. Such positive pitching moment is adapted to cause rotation of the control horn 42 around the axis of the stub spar 38 to cause tilting of the control mechanism 20 and a corresponding tilting of the control stick 24. As will be described below, this force, and other aerodynamic forces, causes the blade and control system to be stable in flight.

Figure 3:
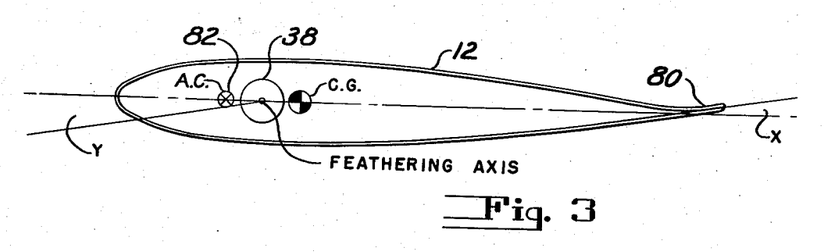
Fig. 3 is a diagrammatic sectional view of the rotor blade taken along the line 3—3 of Fig. 2.

Referring now to Fig. 3, a sectional view of the blade 12 is shown as a substantially symmetrical airfoil section that may be of the type known as NACA 0012. The present invention however is not limited to use only with such section, but can be used with other airfoil sectional shapes. However, it is preferred to use an airfoil section in which the aerodynamic center does not travel chordwise to any great extent through different angles of attack but where a positive aerodynamic pitching moment may be obtained.

The tab 80 is bent upward in angle of $x$ with respect to the mean chord line of the blade 12. Although different blades will require different angles of $x$, I have found that 5 to 25 degrees will function satisfactorily with NACA 0012 airfoils depending upon the chordwise width of the tab (5° for ¼" width on an average 14" blade chord is satisfactory). Inasmuch as the flow of air across the trailing edge of the blade 12 is substantially independent of the angle of attack of the blade 12 substantially up to the angle of stall, the effect of the tab will be practically constant for any given angle of attack within such range for a given air speed. However, at different air speed the effect of the tab 80 may vary greatly. Inasmuch as the lift of an airfoil section is substantially a velocity squared function, the effect of the tab 80 will vary appreciably in each revolution under translational flight conditions of a helicopter rotor. As will appear hereinafter, greater tab deflection upward (increasing the angle $x$) will increase the stability consistent with the allowable loss of lifting capacity which must be sacrificed.

It should be understood that the theoretical discussion of the operation of my invention set forth below is based upon the best considerations of the present state of the art.

For the purpose of describing my invention, the blade 12 may be assumed to be rotating at substantially a constant pitch when the helicopter to which the blade is attached is in translation. At such time there will be a predetermined angle of attack that will vary due to the aerodynamics of a rotor in yawing flight as will be described more fully in connection with Figs. 4 and 5. For the purpose of describing the fore and aft stabilization of the rotor it should be noted that the advancing blade or blades 12 will encounter air at a velocity equal to the sum of the speed of translation of the craft and the speed of rotation of the blade. Of course, the air speed varies continuously and attains a maximum when the blade is at right angles to the body of the ship or the 90° position in the advancing portion of its cycle. In case the ship is moving at 100 M. P. H., and the tip speed of the blade is 300 M. P. H., the total speed of the tip of the blade at the above mentioned 90° position will be 400 M. P. H. As the blade retreats, the forward speed will be subtracted from this tip speed with the result that the total speed will be 200 M. P. H. at a diametrically opposite point of revolution. In different portions in the cycle of revolution, different speeds are attained, and the true value of different speeds may be obtained by integrating the speed of revolution and adding with the angular vector of speed of translation for an entire cycle. The significant fact about this difference between advancing and retreating blades is that the pitch increasing effect of the tab 80 of the blade varies as the square of the total velocity, and hence a greater pitch increasing effect obtains in the advancing portion of the cycle of the blade.

Referring again to Fig. 2, it will be noted that as the pitch increasing force caused by the tab 80 will rotate the blade 12 upon the bearings of the sleeve 40, the control horn 42 will be raised. This action will tilt the control mechanism 20 and thus raise the push-pull rod 60 and move the rod 54 toward the left. This force then gives the same effect as if the stick were manually moved to cause relative rearward tilting of the tip path plane of the rotor blade 12. Inasmuch as the helicopter is in forward flight to attain such differential action of the tab 80, it is seen that the resultant action is one for stabilizing the ship in flight. In other words, it is necessary for an operator to prevent movement of the stick 24 in response to the pitch increasing action of the tab 80 in order to maintain a given state of flight. If the force is removed from the stick by the operator, the ship will decelerate to substantially zero air speed. This structure is very sensitive because it responds to the square of the differential velocity of the rotor blade during translation and always tends to maintain zero air speed for the helicopter. It is to be understood that the stick 24 can be biased if desired to impose a predetermined force opposing the action of the tab 80 so that the craft can be flown "hands off" at any speed at which the bias compensates the forces set upon as described above.

The effect of the tab 80, and also of a forward location of the areodynamic center 82, is to provide a constant pitch increasing force. If desired, this force however may conveniently be taken up by the total pitch control arm 22 which may be suitably biased to assume the load. The forward location of the aerodynamic center, and the stabilizing effect thereof, will now be described.

When a rotor is in translation in yawing flight the forward velocity will effect a shift in the maximum and minimum points of flapping of the blade. At zero airspeed the lift of a blade is substantially constant during its entire revolution. In order to start translation, the lift of a retreating blade is slightly greater than the lift of an advancing blade in order to tilt the tip path plane. As the speed increases, the rotor may be tilted in space and exert substantially a constant lift during its entire revolution but will have progressively different angles of attack at different portions in its cycle. As also pointed out above, the cyclic pitch of a rotor blade in some craft may be negligible for a given condition of forward flight, although the invention covers other conditions. For this reason, by way of example, it is possible to make use of the formula evolved by the National Advisory Committee for Aeronautics in their Report No. 487 which is for fixed blade setting (non-feathering) upon which the charts for Figs. 4 and 5 have been evolved and are based. Even though with some different air-foil sections, or twisted blades, or both, the charts will vary somewhat from that shown, for the portion of the cycle of revolution used for obtaining lateral stability for a helicopter rotor, the diagrams of Figs. 4 and 5 form a convenient way of illustrating the phenomena.

Figure 4:
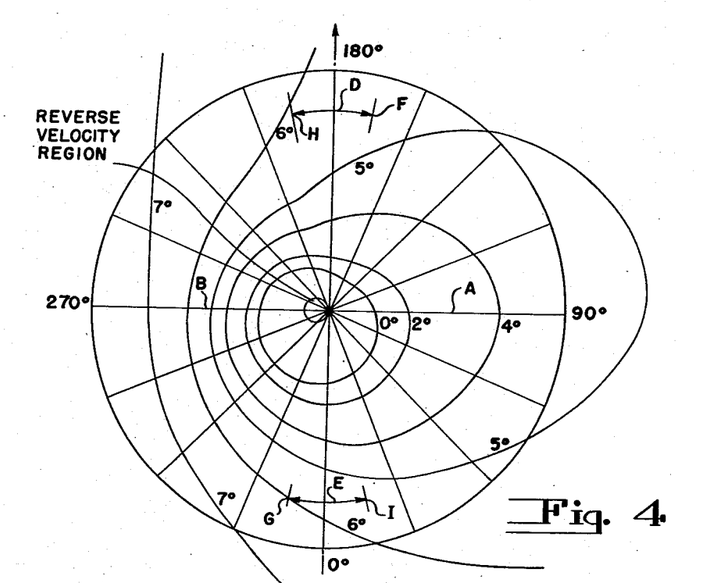
Figs. 4 and 5 are charts indicating the angle of attack at various points on a rotor blade during rotation and translation at different speeds.
Figure 5:
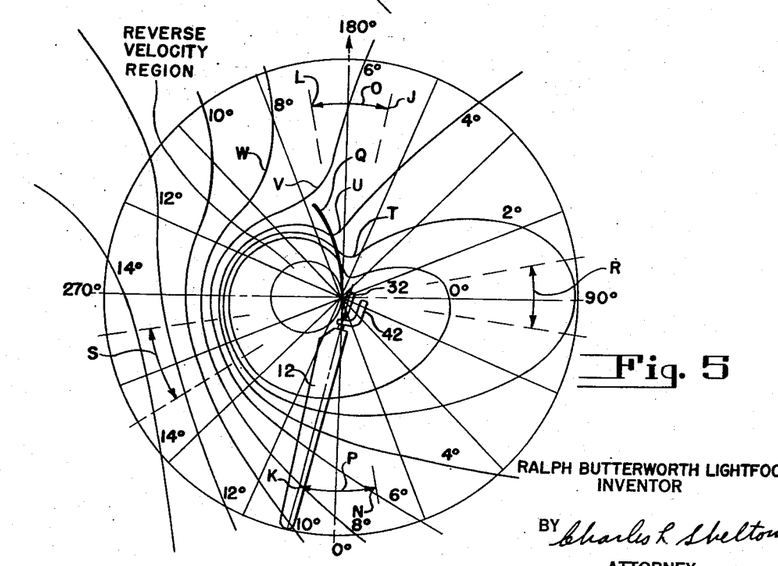

Fig. 4 is a diagram showing angles of attack for different points of a blade at different points in a revolution at a translatory speed of substantially 33 M. P. H. of the ship; and Fig. 5 is a similar chart at a speed of substantially 100 M. P. H. of the ship. The lines radiating from the center at each 22½° may approximate a blade axis and a point of 50% radius would lie halfway from the center of the chart to the outermost circle thereof. The outer circle represents the path of the tip of the blade. Accordingly at the point A on the line bearing the character 90° the effective angle of attack at 50% radius is substantially 3°. At the point B, the effective angle of attack at 50% radius is substantially 5°. These values enter into the longitudinal stability forces created by the forward offset aerodynamic center 82 of the blade and illustrate that there is a progressive change of angle of attack during the rotation of a blade in flight even though the blade is non-feathering. The integrated effect of this variation of angle of attack is to cause a rightward and backward force on the rotor as speed is increased requiring a leftward and forward stick motion for trim. It is obvious that the fore and aft stick forces and displacement affect longitudinal stability while the lateral stick forces and displacements affect lateral stability.

Consider now only lateral stability. In a range represented by the lines D and E, which are substantially 180 degrees apart, the effect on the blade caused by forward velocity is approximately the same. However, at the point F, the effective angle of attack is approximately 5⅓° and at the point G, it is approximately 6°. At the point H, it is approximately 6° and at the point I, it is approximately 5½°. It is to be noted that the angle of attack is slightly greater in the range E than in the range D. Because the aerodynamic center 82 (Fig. 3), is forward of the feathering axis of the blade 12, a resultant pitch increasing moment will be exerted due to this difference in angle of attack, which moment will act upon the control mechanism for causing tilting thereof during translation of the ship. At the low speed indicated in Fig. 4, this force is only slight and would tend to move the control stick 24 toward the left slightly because the force through the range E is greater than the range D. Thus a lateral destabilizing control force will be exerted moving the stick to the left. This destabilizing force has been normally associated with higher speed in conventional helicopters.

In Fig. 5, a similar chart is plotted for a higher forward speed when a greater tendency for the ship to fly off to the right will occur requiring a leftward movement of the stick 24 for trim. At the point J the angle of attack is approximately 5°, and at the point K the angle of attack is approximately 8°. At the point L the angle of attack is approximately 7°, and at the point N the angle of attack is approximately 6°. Radially, however, the angle of attack is substantially constant in the region O, while a marked decrease of angle is noted in the range P as the root of the blade is approached. Hence in the range O the effective angle of attack is greater than in the range P. This difference is somewhat greater and contrary to the difference pointed out in connection with Fig. 4. Hence, a considerable lateral stabilizing force will be exerted on the stick at a higher speed. This force will act to the right. A line Q may represent stick travel upon increasing speed; with an increase in speed being represented by the forward and leftward component of the line Q. Accordingly, it is seen that the forward location of the aerodynamic center 82 causes a pitching moment independent of the tab 80 and in a direction for providing a lateral stick force in response to translation of the rotor beyond certain speeds. This aerodynamic center displacement gives a rightward stick force increasing with speed. Tab 80 is sensitive to speed but in regions O and P the forces are cancelled since the velocities acting on the blades are equal. Thus, in combination with the rearward longitudinal stability forces (above described) the lateral forces tend to move the stick to a position associated with slower speed and along the path Q. The exact position of the aerodynamic center 82 may vary with airfoils of different configuration, however, I have found that a convenient location in connection with a NACA 0012 airfoil is as follows: With the aerodynamic center at 25% of the chord, the feathering axis may be located at approximately 25.25% of the chord.

In the structure above described the control system is reversible, i. e., not only is a force applied to controls 28 transmitted to the blades but aerodynamic forces acting on the blade are transmitted from the blades back to the controls. By pitch change is meant the ability of a blade to change its angle of incidence relative to a plane perpendicular to the drive shaft either by motion around the pitch changing bearings 40 or by torsional flexibility of the blade structure itself. If a blade is torsionally flexible, even though an irreversible mechanism is placed somewhere in the control system, this is similar in characteristics to a reversible control system.

If the spar or feathering axis is located at approximately 25.25% of the chord, when the aerodynamic center 82 is located at substantially 25% of the chord, I find that the center of gravity may be located at about 25.3% of the chord for providing dynamic damping results to be pointed out below, when the pitch increasing moment of an elementary blade section is .13 ft. lbs. per sq. ft. at 100 M. P. H. Of course, it is to be understood that reasonable variations from the above-mentioned values are possible and that the ship may operate satisfactorily with rather wide variations in these values. It is important that the values be generous, or in other words, provide a large enough space between the feathering axis and the location of the aerodynamic center so that a positive pitching moment is obtained assuming the aerodynamic center may travel somewhat during flight, as it does with certain airfoils, and probably does to some extent even in the airfoils preferred, namely the NACA 00-series. Obviously, as parts may warp, or be strained and hence slightly deformed during operation, the aerodynamic center may travel to a certain degree in almost any blade.

To sum up the longitudinal and lateral stabilization features described above, and to define some of the variations of equivalents thereof, whereby to enable others skilled in the art to practice my invention, and enable them to apply the principles to rotors including blades of different airfoil shapes and/or different structure for varying blade lift, the following salient features should be noted. The tab 80, or equivalent means, should be responsive primarily to air speed and affected as little as practicably possible by changes in pitch, or in angle of attack of a blade. The means 80 should be connected with manual or automatic controls in such manner that an increase in translational speed will cause an increase in tendency for the controls to return to a zero air speed producing attitude. For uncontrolled blades, for example aerodynamically rotated blades, the means 80 may act directly upon the blade to change the lift thereof to render the same stable, which could be accomplished conveniently with torsional relatively flexible blades. For instance in an autogyro where the pilot may not have control of the cyclic pitch of the blades, a negative aerodynamic pitching moment on the blades will create a diving tendency on the rotor and consequently on the entire aircraft which the pilot may not be able to overcome with the available control means. I believe this to be the cause of several fatal accidents. For blades in which controlled movable sections are used for varying lift, the means 80 may be associated with such sections to cause movement of the controls in a stabilizing direction in response to translation. The degree of moment may vary widely, but it is preferred that a great enough force be exerted upon the control system so that, even in slow speed flight, friction of connections can be overcome while still providing a measurable corrective stick force. Such force can be measured directly upon the stick, or upon connecting parts, by any conventional strain or force measuring mechanism.

The lateral stabilizing means (the aerodynamic center forwardly spaced with respect to the feathering axis) should respond positively in the forward and rearward portions of the cycle of revolution of a blade. This means responds to the inherent shift of angle of attack in response to translation of the craft. At the effective portions in the cycle there is little change in pitch, even in a feathering blade, hence this stabilizng attribute obtains no matter what shape of blade is used, although it is preferred to use symmetrical airfoils. Thus it is seen that lateral stabilization is obtained in response to angle of attack variation, substantially independently of the means 80 for providing longitudinal stability, the latter of which is responsive to differential air-speed, as pointed out above.

*Dynamic damping*

Figure 6:
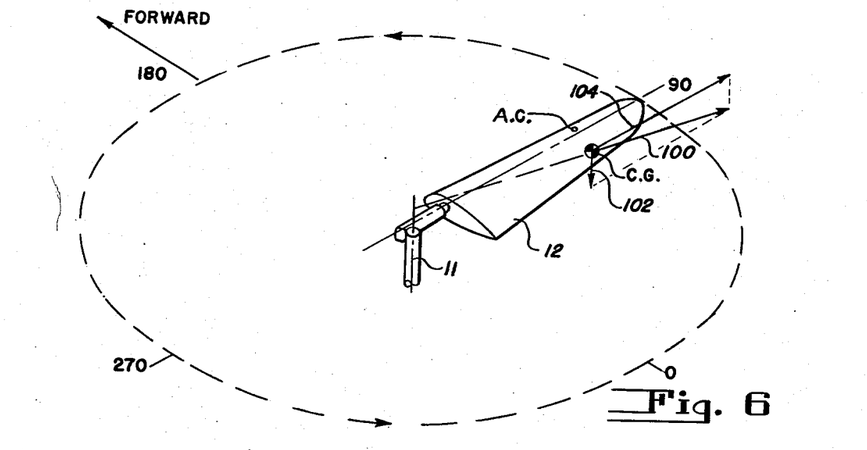
Fig. 6 is a diagrammatic perspective view of a rotor blade revolving about its axis.
Figure 7:
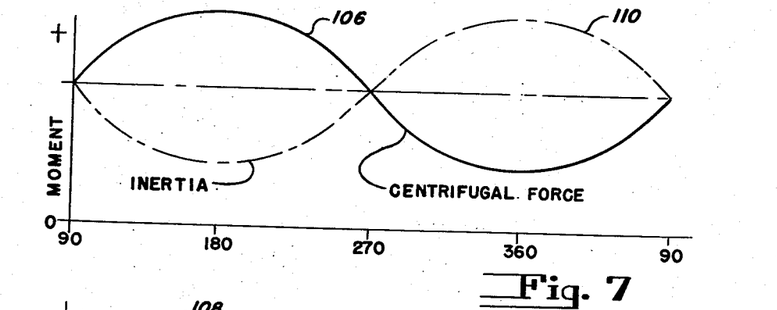
Figs. 7 and 8 are charts indicating centrifugal force and inertia force with blade azimuth angle.

In Fig. 6, the rotor blade 12 is shown diagrammatically in perspective for turning around the axis 11. The blade 12 has its center of gravity located behind the feathering axis and its center of lift ahead of said axis in the manner shown in Fig. 3. As the blade 12 revolves, it will cone upwardly to traverse a flattened cone, and will flap upwardly in the front of each revolution and downwardly at the rear with respect to the body 10 during forward flight, because the velocity is the sum of the rotational speed and the translational speed. In the coned position, the center of gravity will exert a centrifugal force resulting outwardly from the axis 11 indicated generally by the reference character 100, which force may be divided into a downward component 102 and an outward component 104. The downward component will create a couple with the lift forces acting at the center of lift to cause a pitch increasing moment to be exerted upon the blade 12. Due to the fact that the blade flaps higher at 180 degrees, the downward component of the centrifugal force will exert the greatest moment 102 at 180° and the least moment at 360° (0°) in its cycle. Such moment is represented by a line 106 of Fig. 7, and it is to be noted that this is a substantially sinusoidal curve.

As the blade flaps upwardly and downwardly in its cycle, that is, upwardly at the front and downwardly at the rear, a variable pitch changing force will be exerted due to acceleration caused by the momentum of the blade tending to maintain upward or downward motion, as the case may be. This inertia force will be greatest when the blade is changing between upward and downward flapping. The flapping angle is represented by a line 108 of Fig. 8 and attains the maximum at the 180° position and a minimum at the 360° position. A sinusoidal plot may be made of the pitching moment produced by the attendant inertia force and represented by a line 110 of Fig. 7. It is to be noted that lines 106 and 110 are substantially 180° out of phase with each other and hence tend to cancel each other out. Because both of these moments are dependent upon the mass of the blade, and the distance thereof between the center of gravity and the feathering axis of the blade, the forces may be equal and opposite. Therefore, the primary mode of vibration due to the rearwardly positioned center of gravity will be substantially cancelled out.

Figure 8:
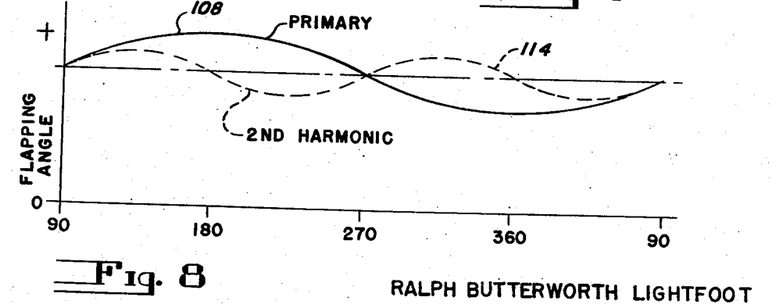

However, there exist secondary flapping motions of the blades which give rise to a second harmonic vibration represented by a line 114 of Fig. 8 as a result of the asymmetrical load distribution represented by the Figs. 4 and 5. This primary vibration is of less magnitude than the primary vibration and may attain nodal points at the 90°, 180°, 270°, and 360° blade positions. It will be noted in Fig. 5 that in the range R a blade will have a minimum angle of attack, and in a range S will have substantially its greatest angle of attack for the entire blade radius. The ranges R and S are not diametrically opposed to each other. It is also to be noted that a forced reversal of angle of attack will occur at points T, U, V, and W as points are taken outward from the center of rotation toward the tip path of the blade. It is further to be noted that the change in aerodynamic action upon the blade is asymmetric substantially from these points T, U, V, and W, and attains a minimum in the range R and a maximum in the range S, and also that the values change upon increasing speed from that represented by Fig. 4 to that represented by Fig. 5. This second harmonic flapping motion will produce corresponding moments about the feathering axis due to inertia similar to that action described above with relation of the first harmonic but which are not entirely cancelled out by the downward component of centrifugal force. However, since the moment produced by the tab 80 is a function of the square of the resultant velocity at an element of the blade, it will also produce second harmonic moments. I have found that the second harmonic of inertia vibration due to the secondary flapping as represented in Fig. 8 is sufficiently out of phase with the tab vibration just described to have a tendency to damp the secondary vibration.

By properly placing the center of gravity and the aerodynamic center of a blade with respect to the feathering axis thereof, the vibratory dynamic moments and aerodynamic moments may be made to substantially cancel each other, and hence a blade, and connecting parts thereof, will not be stressed greatly due to operation. I have found that the center of gravity may be located aft of the aerodynamic center by an amount equal to the product of six-tenths of the chord times the aerodynamic pitching moment coefficient about the aerodynamic center expressed in standard NACA non-dimensional units. Accordingly, it becomes possible with my invention to improve the safety factor of blades while also providing means for stabilizing the blades for translational as well as lateral flight.

Although for the purpose of free stick stability it is desired to have a fully reversible control system, the present invention is equally applicable to a system which is wholly or partially irreversible inasmuch as in the wholly irreversible system the pilot will still have to overcome the pitching moments of the blades if he moves the control to vary the pitch of the blades cyclically.

If the control is not moved by the pilot the overall system will approach that of the fixed pitch autogiro previously referred to.

While I have shown and described my invention in connection with a helicopter of the kind shown and described in the above-mentioned Sikorsky application, it is to be clearly understood that the features hereof are not limited to use only with such craft, but may be used with other craft within the spirit and scope of the subjoined claims.

I claim:

1. A rotary wing aircraft including, in combination, a rotor including a rotatable shaft, a rotor hub carried by said shaft having a plurality of dynamically and aerodynamically balanced blades pivotally mounted on said hub for pitch changing movement about their longitudinal axes, pilot operated control means for cyclically changing the pitch of said blades including a manually operable control member having an operative connection to each blade through which forces can be transmitted from said control member to said blades, said blades having an airfoil cross section and having an upswept trailing edge which is rigid in flight producing a blade pitch increasing moment which increases with increased speed of said aircraft and results in a force on said control member to move the latter in a direction opposite to the direction of flight, each of said blades also having its aerodynamic center located a substantially constant chordwise distance in advance of its axis of pitch change throughout the major portion of the span of the blade for producing a lateral stabilizing force on said control member which increases with increased translational velocity of said aircraft in an outboard lateral direction toward the side of the rotor on which a blade is advancing.

2. A rotary wing aircraft including, in combination, a rotor including a rotatable shaft, a rotor hub carried by said shaft having a plurality of dynamically and aerodynamically balanced blades pivotally mounted on said hub for pitch changing movement about their longitudinal axes, pilot operated control means for cyclically changing the pitch of said blades including a manually operable control member having an operative connection to said blades through which blade forces can be transmitted from said member to said blades and also be transmitted back to said control member, means for producing longitudinal stability of said control member comprising an upswept trailing edge on said blades which is rigid during flight producing a blade pitch increasing moment resulting in a force acting on said control member in a direction opposite to the direction of flight which increases with increased translational speed of said aircraft, each of said blades having its aerodynamic center located forward of its pitch changing axis throughout the major span of the blade for producing a lateral stabilizing force on said control member which increases with increased translational velocity of said aircraft in an outboard direction toward the side of the rotor on which the blade is advancing.

3. A rotary wing aircraft including, in combination, a rotor including a rotatable shaft, a rotor hub carried by said shaft having a plurality of dynamically and aerodynamically balanced blades pivotally mounted on said hub for pitch changing movement about their longitudinal axes, pilot operated control means for cyclically changing the pitch of said blades including a pilot operated control member having an operative connection to said blades through which blade forces are transmitted from said control member to said blades and from said blades back to said control member, each of said blades having a generally symmetrical cross section and having its aerodynamic center located forward of said pitch changing axis throughout the major span of the blade for producing a lateral stabilizing force on said control member which increases with increased translational velocity of said aircraft, and means which is substantially ineffective in the rotor path range where said lateral stabilizing force operates for providing longitudinal stability of said control member, said means for producing longitudinal stability comprising an upswept trailing edge portion on each blade which is rigid in flight for producing a blade pitch increasing moment resulting in a force which acts on said control member to move the latter in a direction opposite to the direction of flight and which increases in force with increased speed of said aircraft.

4. A rotary wing aircraft including, in combination, a rotor comprising a rotatable shaft and a plurality of dynamically and aerodynamically balanced blades pivotally connected to said shaft for pitch changing movements about their feathering axes, movable control means including a pilot operated control member for cyclically changing the pitch of said blades having an operative connection to said blades through which blade forces can be transmitted from said member to said blades and from said blades back to said member, each of said blades having its aerodynamic center ahead of its feathering axis for causing a cyclically variable pitch changing force upon said member in response to variations in the angle of attack of said blade, and an upswept tab on the trailing edge of each blade which is rigid during flight for causing a cyclically variable pitch changing force upon said control member in response to cyclic variations in air speed of said blades.

5. The method of obtaining fore and aft stability of the controls of a rotary wing aircraft of the type which has a plurality of variable pitch blades pivotally mounted on a rotary drive shaft for movement about their pitch changing axes and a pilot operated control member having an operative connection to said blades for varying the pitch thereof cyclically, comprising the steps of dynamically balancing the several blades so that they all have equal dynamic pitching moments at every angle of blade pitch, and varying the airfoil contour of each of the blades an amount to produce equal aerodynamic pitch increasing moments on each of the blades when rotated at zero blade lift to produce a force in said controls in a direction opposite to the direction of flight and which force will increase with increased speed of the aircraft.

6. The method of obtaining fore and aft stability of the controls of a rotary wing aircraft of the type which has a plurality of variable pitch blades pivotally mounted on a rotary drive shaft for movement about their pitch changing axes and a pilot operated control member having an operative connection to said blades for varying the pitch thereof cyclically, comprising the steps of dynamically balancing the several blades so that they all have equal dynamic pitching moments at every angle of blade pitch, and deflecting a portion of the trailing edge of each of said blades to provide an upswept tab which is rigid in flight so as to produce an aerodynamic moment equal in magnitude on each blade when rotated at an average zero pitch and which causes pivoting of said blades and thereby movement of said control member to cyclically vary the pitch of said blades in response to the change in differential airspeed of said blades to induce forces in said controls opposing any change in translational speed of said aircraft.

7. The method of obtaining fore and aft stability of the control member of a rotary wing aircraft of the type which has a plurality of variable pitch blades pivotally mounted on a rotary drive shaft for movement about their pitch changing axes and pitch control means having an operative connection to said blades and to said control member for varying the pitch of said blades cyclically, comprising the steps of dynamically balancing the several blades so that they all have equal dynamic pitching moments at every angle of blade pitch, aerodynamically balancing the several blades so that they all have equal aerodynamic pitching moments at any given angle of blade pitch throughout the entire flight range, and bending the trailing edges of the several blades upwardly an amount to produce a blade pitch increasing moment equal on all blades to create a force which acts on said control member to move the latter in a direction opposite to the direction of flight and which force increases with increased translational speed of the aircraft.

8. The method of obtaining fore and aft stability of the control member of a rotary wing aircraft of the type which has a plurality of variable pitch blades pivotally mounted on a rotary drive shaft for movement about their pitch changing axes and pitch control means having an operative connection to said blades and to said control member for varying the pitch of said blades cyclically, comprising the steps of dynamically balancing the several blades so that they all have equal dynamic pitching moments at every angle of blade pitch, and adjusting the pitching moments of the several blades so that they all have the same aerodynamic pitching moment at any given angle of blade pitch throughout the flight range and to the extent that all blades have the same aerodynamic pitch increasing moment at zero blade pitch angle.

9. The method of obtaining lateral stability of the controls of a rotary wing aircraft of the type which has a plurality of variable pitch blades pivotally mounted on a rotary drive shaft for movement about their pitch changing axes and a pilot operated control member having an operative connection to said blades which includes means for varying the pitch of said blades cyclically, comprising the steps of dynamically balancing the several blades so that they all have equal dynamic pitching moments at every angle of blade pitch, aerodynamically balancing the several blades so that about their aerodynamic centers they all have equal aerodynamic pitching moments throughout the entire flight range, and locating the aerodynamic center of the airfoil section for each blade a substantially constant chordwise distance in advance of its axis of pitch change throughout a substantial spanwise portion of the blade to produce a lateral stabilizing force on said control member which increases with increased translational velocity of the aircraft in an outboard lateral direction toward the side of the rotor on which a blade is advancing.

10. The method of obtaining lateral stability of the controls of a rotary wing aircraft of the type which has a plurality of variable pitch blades pivotally mounted on a rotary drive shaft for movement about their pitch changing axes and a pilot operated control member having an operative connection to said blades which includes means for varying the pitch of said blades cyclically, comprising the steps of dynamically balancing the several blades so that they all have equal dynamic pitching moments at every angle of blade pitch, aerodynamically balancing the several blades so that about their aerodynamic centers they all have equal aerodynamic pitching moments in a pitch increasing direction throughout the entire flight range, and locating the aerodynamic center of the airfoil section for each blade a substantially constant chordwise distance in advance of its axis of pitch change throughout a substantial spanwise portion of the blade to produce a lateral stabilizing force on said control member which increases with increased translational velocity of the aircraft in an outboard lateral direction toward the side of the rotor on which a blade is advancing.

11. The method of obtaining stick stability in a rotary wing aircraft of the type which has a plurality of variable pitch blades pivotally mounted on a drive shaft for movement about their pitch changing axes and a pilot operated stick having an operative connection to said blades for varying the pitch thereof comprising the steps of, dynamically and aerodynamically balancing the several blades so that they all have equal dynamic pitching moments at every angle of blade pitch and equal aerodynamic pitching moments in a pitch increasing direction at a pitch angle when the lift of the blade is substantially zero, and producing a lateral stabilizing force on said stick which increases with increased translational velocity of the aircraft and which acts in an outboard lateral direction toward the side of the rotor on which a blade is advancing, by locating the aerodynamic center of the blade a substantially constant chordwise distance ahead of the pitch changing axis of the blade throughout a substantial spanwise portion of the blade.

12. A rotary wing aircraft including, a rotor comprising a rotatable shaft, a plurality of variable pitch blades pivotally connected to said shaft for movement about their pitch changing axes, movable control means for controlling the pitch of said blades including a pilot operated member having an operative connection to said blades through which forces can be transmitted from said member to said blades, said blades having upswept trailing edges whereby they have substantially equal chordwise dynamic pitching moments at every angle of blade pitch and equal aerodynamic pitching moments in a pitch increasing direction throughout the flight range, said blades also having their center of gravity aft of their aerodynamic center and having their pitch changing axis located intermediate said aerodynamic center and said center of gravity.

13. A rotary wing aircraft including, a rotor comprising a rotatable shaft and a plurality of dynamically and aerodynamically balanced blades connected to said shaft for movement about a pitch changing axis, movable control means for changing the pitch of said blades including a manually operable member having an operative connection to said blades through which control forces can be transmitted from said member to said blades, each of said blades having its aerodynamic center located a substantially constant chordwise distance ahead of said pitch changing axis throughout a substantial spanwise portion of the blade and having its center of gravity located aft of said aerodynamic center by an amount equal to the product of six-tenths of the blade chord times the aerodynamic pitching moment coefficient about said aerodynamic center expressed in standard NACA non-dimensional units.

RALPH B. LIGHTFOOT.

References Cited in the file of this patent

UNITED STATES PATENTS

| Number | Name | Date |
|---|---|---|
| 1,949,785 | Cierva | Mar. 6, 1934 |
| 1,950,411 | Larsen | Mar. 13, 1934 |
| 1,990,291 | Larsen | Feb. 5, 1935 |
| 1,999,136 | Cierva | Apr. 23, 1935 |
| 2,021,470 | Upson | Nov. 19, 1935 |
| 2,070,657 | Hafner | Feb. 16, 1937 |
| 2,135,700 | Cierva | Nov. 8, 1938 |
| 2,265,366 | Hafner | Dec. 9, 1941 |

OTHER REFERENCES

Aviation Handbook by Warner & Johnson, published by McGraw-Hill Book Co., 1931.